INVENTORS
HARALD F. FUNK,
& PAULA M. SARTEN
BY
WATTS, HOFFMANN, FISHER & HEINKE
ATTORNEYS

INVENTORS
HARALD F. FUNK,
& PAULA M. SARTEN
BY WATTS, HOFFMANN, FISHER & HEINKE
ATTORNEYS

United States Patent Office 3,523,911
Patented Aug. 11, 1970

3,523,911
METHOD OF SEPARATING COMPONENTS
OF CELLULOSIC MATERIAL
Harald F. Funk, 68 Elm St., Murray Hill, N.J. 07971, and Paula M. Sarten, 24 Munchberg Str., 8 Munich 9, Germany
Continuation-in-part of application Ser. No. 577,374, Sept. 6, 1966. This application Feb. 26, 1969, Ser. No. 802,624
Int. Cl. C01b 31/10; C13k 9/00
U.S. Cl. 252—421                     11 Claims

ABSTRACT OF THE DISCLOSURE

A method for treating, in the heated upper portion of a vessel, cellulosic material including hemicellulose and lignin by steam and dilute aqueous acid vapors. Sugars are removed with condensate from the lower portion of the vessel. Vapors of tars and acids are driven from the condensate-free residue material and the latter is carbonized by heating the latter in the presence of inert gases. The carbon is activated by treating it with highly heated gases and steam. The method is preferably continuous.

---

This application is a continuation-in-part of our copending application, Ser. No. 577,374, filed Sept. 6, 1966, now abandoned.

BACKGROUND

For many years workers in the art have proposed different methods of treating cellulosic materials for the recovery of tars and acids and the production of charcoal. So far as we know, none of those methods recovered the sugars, as well as the tars and acids, and produced activated carbon, and none of those methods produced the products in successive temperature zones. When activated carbon was desired, the charcoal was subjected to activation in a separate process.

The prior art which is most nearly pertinent to the present invention and which is known to us consists of U.S. patents to Demme No. 1,249,041, Sauer No. 1,563,295, Elian et al. No. 2,734,836 and Work et al. No. 3,184,397.

SUMMARY

The present invention provides a method which is preferably continuous and by which cellulosic material including lignin and hemicellulose may be treated so that the raw sugars may be removed in a low temperature range and recovered with condensate, the tars may be removed in a higher temperature range and recovered as a condensate, and the remaining material may be converted into highly activated carbon in a still higher temperature range, with the production of acids and inert gases which can be utilized in the removal of the sugar and tars.

The method of the present invention may be applied to various types of the said cellulosic materials including particularly woods such as birch, hard and soft maple, beech and the like and mixtures of one or more of those woods. The said cellulosic material to be treated should be in finely divided form such as sawdust, small chips or broken and partly pulverized bark.

Dilute aqueous acids are preferably employed in the extraction part of the method. The amount of sugar recovered without the use of any acid is quite small and is ordinarily considered as being non-commercial. The acid should range between about 0.5% and about 6%. This range is quite economical since it recovers most of the sugar of the hemicellulose without breaking down any substantial amount of the cellulose and prepares the residue for ready activation to a high degree.

Many organic and inorganic acids may be used in this method. Among the inorganic acids may be mentioned hydrochloric, sulphuric, nitric, hydrofluoric, hydrobromic and the like. Among the organic acids may be mentioned formic, acetic, and pyroligneous acid. It is preferable to add the organic acids when the method is being initiated, although such acids are generated throughout the extraction phase and can be recycled after separation from the sugars. Such recycled acids increase the amount of sugar recovered as contrasted with the extraction performed in the absence of an acid solution. The inorganic acids reduce the ash content of the final carbon and promote hydrolysis at an increased rate.

Acid solutions which have been used consisted of (1) about 2% of acetic acid and about 1% of formic acid and about .6% of hydrochloric acid and (2) about 2% of acetic acid and about 1% of formic acid.

The present method invention will be better understood by the following examples:

EXAMPLE 1

Figure 2:
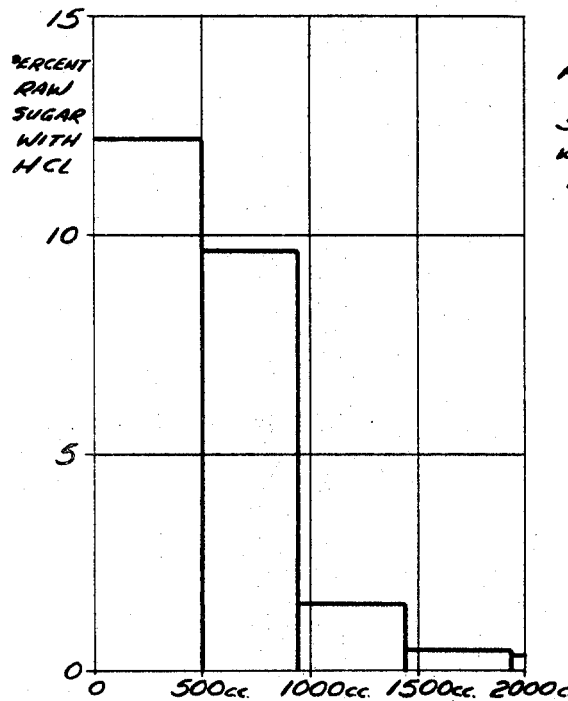
FIGS. 2 and 3 are charts showing the raw sugars recovered by the present invention when different acid solutions are used.

A charge consisting of 500 grams of finely divided wood containing 132 grams of moisture and made up of equal parts of birch and hard maple was placed in an acid mixture consisting of 14.7 g. of acetic acid, 7.4 g. of formic acid, 4.5 g. of hydrochloric acid, and 604 g. of distilled water. The percentages of raw sugar recovered, based on the wood charged, is shown by FIG. 2 and was 12.12%, 9.70%, 1.55%, 0.48% and 0.34% for the first to fifth lots of about 500 cc. of condensate collected, respectively. These percentages expressed in grams were 61.0, 43.7, 7.6, 2.36 and 0.2 grams, respectively.

The acid present in the first four of those lots of condensate required 9.33, 7.34, 0.71 and 0.09 cc. of N/10 NaOH to titrate.

When about 113.5 grams of the material residue from Example 1 was heated for about 9 hours below 400° C. and for 1 hour at 800° C. while steam was being injected, 148.14 grams of tar and water were recovered. About 24.75 grams of activated carbon, that is, about 21.8% of the material subjected to activation, was found to have a MBT value of about 12 and a BET value of about 985 m.$^2$/g.

The MBT value was determined by mixing 0.1 gram of activated carbon and 10 cc. of 0.15% methylene blue solution at a temperature of about 20° C. and stirring until the color disappeared. Additional 10 cc. quantities of the solution were added until the blue color persisted. The MBT value was the quantity of the solution which was discolored by the carbon. The BET value expressed in square meters per gram was determined by measuring the adsorption of nitrogen by the activated surfaces of the carbon in a stream of helium at a temperature of −190° C. employing a Perkin-Elmer/Shell sorptometer.

EXAMPLE 2

A charge consisting of 510 grams of the wood mixture as prepared for Example 1 and containing 135 grams of moisture was placed in an acid mixture consisting of 15.0 grams of acetic acid, 7.5 grams of formic acid, and 615 grams of distilled water. This charge was heated to 120° C. for four hours and was then extracted with steam at 125° C. for 2 hours. The percentages of sugar recovered, based on the wood charged, for the first, second, third, fourth and fifth lots of condensate were 1.20%, 2.13%, 5.07%, 5.18% and 4.52%, respectively. The weight of the raw sugar represented by these percentages was 0.75, 9.60, 12.90, 14.50 and 20.20 grams, respectively.

The acid present in each of those lots of condensate required, respectively, 5.30, 5.16, 4.42, 2.25 and 0.79 cc. of N/10 NaOH to titrate.

About 70.2 grams of the material residue from Example 2 was heated for about 2 hours to about 450° C. without steam injection, and then for about 3 hours to 850° C. while steam was being injected. About 38.8 grams of tar and water were recovered before the steam was admitted and about 75.85 grams of tar and water were recovered during the time steam was being injected. The activated carbon obtained weighed about 13.8 grams, that is, about 19.65% of the material from the No. 2 example and had a MBT value of 8 and a BET value of 665 m.$^2$/g.

The activated carbon produced by the present method invention is characterized by unusually high activation as is indicated by MBT values ranging from 8 to 15 and a BET value ranging from 665 and 1085 m.$^2$/g. This result is believed to be traceable to the more complete removal of substances from the pores of the wood or by an increase in the number of pores.

Figure 3:
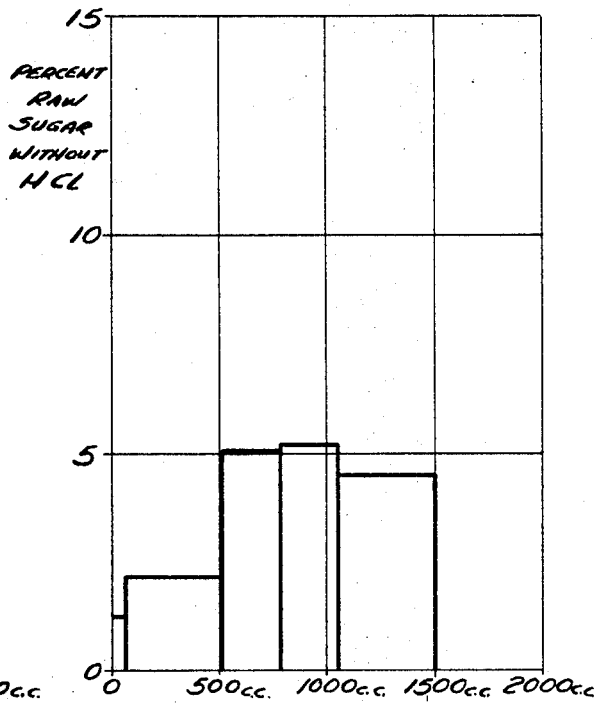

FIGS. 2 and 3 show graphically the sugars recovered in the foregoing Examples 1 and 2. The scale along the left side of these figures shows the percentages of sugars present in each lot of condensate collected.

Figure 4:
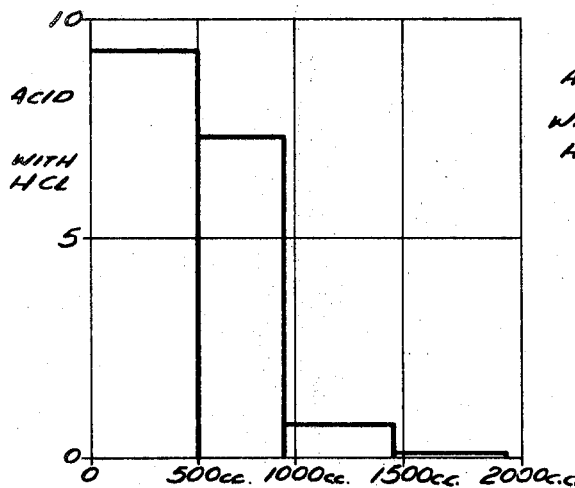
FIGS. 4 and 5 are charts showing the acids recovered when those acid solutions are used.
Figure 5:
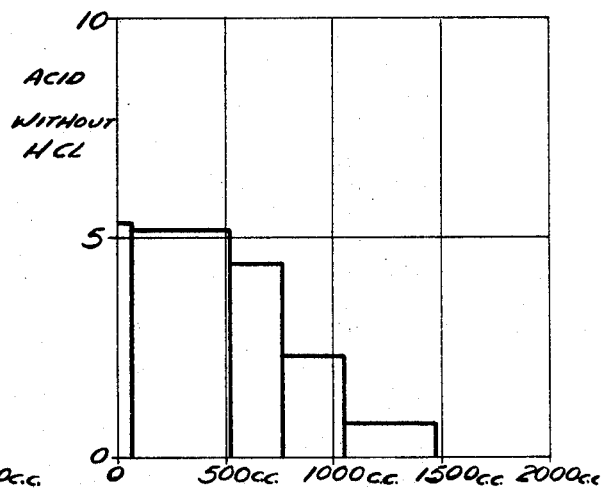

FIGS. 4 and 5 show graphically the acid recovered in Examples 1 and 2 from each lot of condensate. The scale on the left side of the figure is in cc. of N/10 NaOH.

Figure 1:
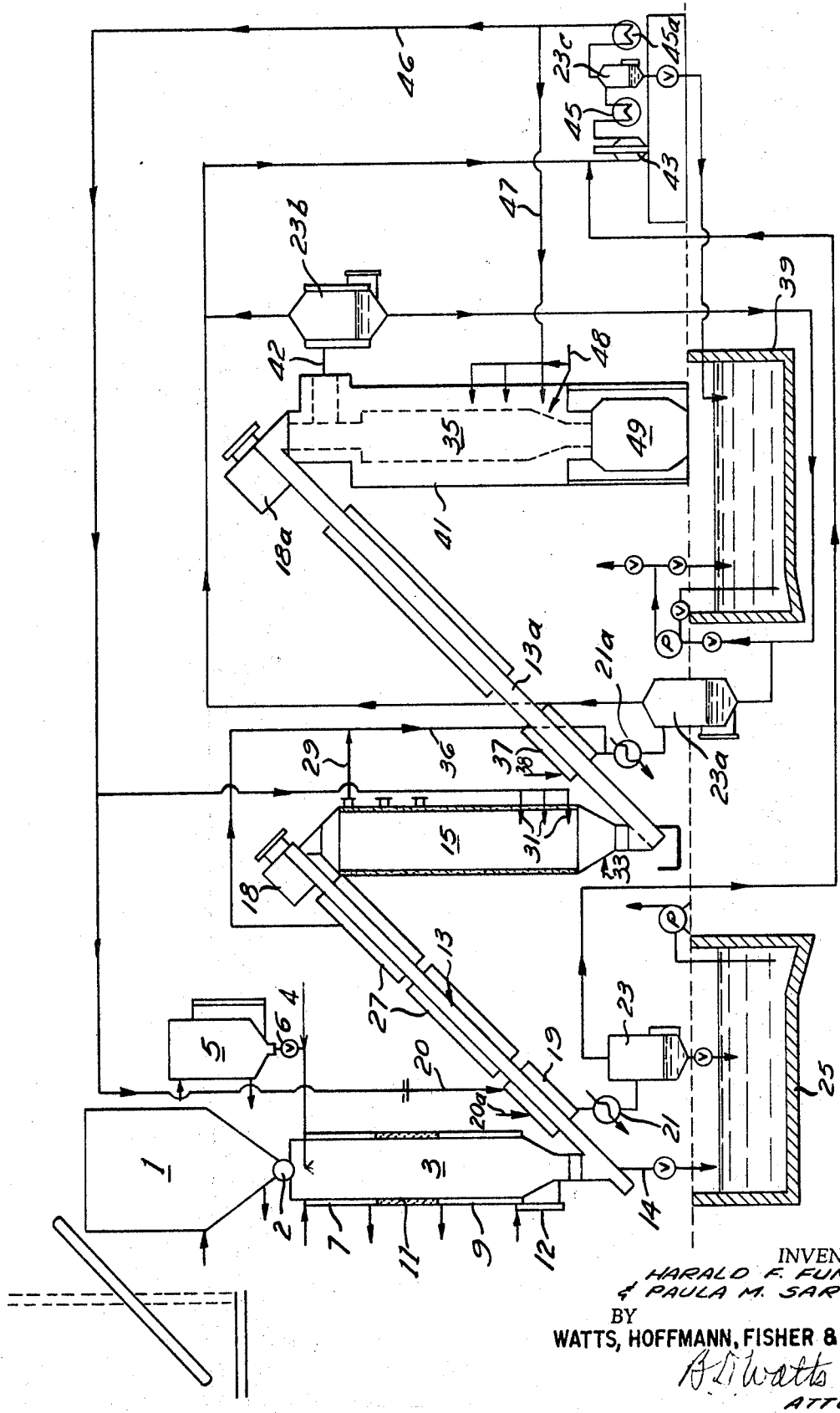
FIG. 1 is a diagrammatic view of one form of apparatus for carrying out the present method invention.

FIG. 1 shows one form of apparatus which may be used to carry out the present method invention.

The bin 1 has an open top to receive the above described cellulosic material which is to be treated and is provided with a valve control outlet 2 at its lower end through which such material may pass into an extraction tower or closed chamber 3. A valve 6 controls the flow of a dilute acid from tank 5 into steam line 4 which opens into the upper end of tower 3 through a spray nozzle. The valve 2 may be of any conventional form through which solids may pass from bin 1 into tower 3 while egress of gases and vapors from tower 3 through the valve may be prevented.

The upper end portion of tower 3 is provided with a steam jacket 7 through which steam may be passed to heat the adjacent portion of the tower and the materials therewithin and to prevent condensation along the tower walls. The lower portion of the tower 3 is provided with a jacket 9 through which cooling fluid may be passed to condense vapors in the tower and the mid portion of the tower is surrounded with insulation 11.

A liquid sight glass 12 is located below jacket 9 to aid in maintaining the liquid level in a predetermined range in the lower part of the tower. A housing 13 is attached at one end to the lower end of tower 3, extends upwardly therefrom and is connected at its upper end to the upper end of carbonizing tower 15. A screen (not shown) at the lower end of housing 13 serves to retain cellulosic material in the tower while permitting liquids, including liquids condensed from vapors by cooler jacket 9, to flow therethrough. A pipe line 14 leads from the bottom of tower 3 into tank 25 and is provided with a valve by which the rate of flow of liquid out of the tower may be controlled and the level of liquid in the tower will be maintained at the desired level. A screw conveyor is positioned within the housing 13 and is actuated by drive means 18 to propel the cellulosic material from the extraction tower 3 to the carbonizing tower 15.

A heater 19 surrounds the housing 13 adjacent to its lower end and is connected at its upper end to a line 20 from a source of heated inert gas under pressure and also to a steam line 20a and at its lower end is connected to a conventional vapor condenser 21 which, in turn, is connected to a separator 23 whence condensate may be discharged through a valve controlled outlet into a tank 25. Steam may be injected into heater 19. The gas and steam contact the cellulosic material and vaporize moisture in it and carry the vapor into condenser 21. Electric heaters 27 for carbonizing the material surround the housing 13 between the gas heater 19 and drive means 18.

The outer surface of the carbonizing tower 15 is covered with insulation, the upper part of the tower is provided with an outlet 29 for gases, the lower portion is provided with inlets 31 for heated inert gases, and with means 33 for the admission of steam at a level below the inlets 31.

A housing 13a is connected to the lower end of the carbonizing tower 15 and extends upwardly and is connected to the upper end of an activating tower 35. A screw conveyor which is disposed within the housing 13a is actuated by drive means 18a and serves to propel solid materials from the lower end of the carbonizing tower 15 into the upper end of the activating tower 35.

A gas injection heater 37 surrounds the lower portion of the housing 13a and is supplied with steam from line 38. Jacket 37 is connected to a steam line and to condenser 21a which, in turn, is connected to separator 23a. Gases from the upper end of housing 13 and from outlet 29 of tower 15 are conducted through line 36 into the condenser 21a and thence into separator 23a.

The activating tower 35 has a refractory lining 41, a gas outlet 42 near its upper end connected to a separator 23b which has a gas outlet at its upper end and a liquid outlet at its lower end. Piping connects the upper ends of separators 23, 23a and 23b to the inlet or suction side of a conventional compressor 43, the outlet from which is connected to a cooler 45. Compressed gases from the cooler pass into the separator 23c whence the gases pass through a heater 45a and then through a pipe line 46 to heater 19, and the lower portions of tower 15 and through line 47 to tower 35. Condensate in separators 23a, 23b and 23c is discharged into tar basin 39.

The lower part of tower 35 is provided with a chamber 49 into which the activated carbon is discharged for cooling before being removed, and the tower is also provided with an inlet 48 for steam at a short distance above the cooling chamber.

In carrying out the present method in the apparatus of FIG. 1, as typified by the two foregoing examples, it will be understood that the extraction tower or closed vessel 3 will be filled up to within about 12 inches of the top thereof with cellulosic material to be treated and containing cellulose, lignin and hemicellulose. Steam flowing in line 4, when valve 6 from tank 5 is open, will vaporize and inject the dilute acid from tank 5 into the space above the material to be treated in tower 3. The steam and acid vapors will penetrate into the interstices of the material being treated, decompose hemicellulose, dissolve the resulting sugars and release the acids thereof. Preferably the material to be treated is discharged from tank 1 into the tower 3 in successive amounts while preventing escape of steam and vapors from the tower through valve 2 and tank 1. The steam and acid vapors and the material being treated are heated in the upper portion of the tower 3 by steam in steam jacket 7.

When the screw conveyor in housing 13 is actuated, solid portions of the material being treated will be removed from the lower end of tower 3 and carried upwardly and discharged into activating tower 35. The successive feedings of cellulosic materials through valve 2 in the tower 3 will be regulated in accordance with the rate of removal of solid materials by the conveyor in housing 13, the purpose being to maintain the top surface of the materials being treated at approximately the original level. Liquids are removed from the bottom of the tower 3 at such a rate that the liquid level will be visible through the sight glass 12.

During the time the material being treated is within the portion of the tower surrounded by steam jacket 7, the acid vapors and the steam will penetrate into those material and decompose the hemicellulose with the production of sugars. As the solid materials move downwardly into the portion of the tower surrounded by insulating material 11, the temperature of the contents of the tower in that zone will be gradually cooled while the extraction of the sugars continues. When the materials being treated and vapors and gases commingled therewith move into the lower portion of the tower which is cooled by cooling jacket 9, the steam will be condensed and will be removed as liquid with the sugars and acids through pipe 12 and into tank 25.

The contents of the upper part of the tower will be heated to about 130° C. by the steam in jacket 7 which is at a pressure of about 3 ata. (28.4 p.s.i.g.). The temperature in the upper part of the tower 3 is preferably held at a level of between about 120° C. and about 130° C. throughout the extraction period but may range from about 100° C. to about 150° C. The heating time may range from about 30 minutes to about 5 hours. As stated above, some of the vapors are condensed by cooler 9 and flow into tank 25. Other vapors which pass out of the tower 3 and into housing 13 will be condensed in condenser 21 and thence into tank 25.

During the extraction period, acids formed in the quantities shown in FIG. 3 were assumed to consist mainly of acetic acid.

The products of the carbonizing action which takes place in tower 15 include gases, such as $CO$, $CO_2$, $H_2$, $CH_4$ and $C_2H_4$ and liquids including tar, water, phenols, acetone, methanol and acids. When the method is initiated, an inert gas such as $CO_2$ is discharged into the carbonizing tower as a protection to the cellulosic material. As the method continues, the inert gases produced and returned to the carbonizing tower may be sufficient to replace much of, if not all, the $CO_2$ required for such protection. The temperature in the carbonizing tower may range from between about 280° C. and about 500° C. and the heating time may range from about 2 to about 12 hours.

The importance of the present invention may be seen from the products obtained from it. The amount of sugars recoverable from the specified woods ranged between about 10% and about 40% of the wood treated. Those sugars consisted principally of pentoses and hexoses and are available for any of the ordinary well known uses such as the manufacture of low calorie sugars, furfural, alcohol, proteins, cattle feeds and the like.

The acids produced may range from about 5% to about 10% of the dry wood weight and may be utilized in the method in lieu of acids which otherwise would have to be added, or they may be separated and used as such or refined and then used.

The amounts of tars recoverable from the specified wood range between about 12% and about 40% of the weight of dry wood treated. These tars are light and are suitable for various uses, as in the production of tall oils, creosotes, maltol, quaiacol and other similar substances. Some of these tars are water soluble and others are water insoluble. The temperature in the activating tower may range between about 500° C. and about 1000° C.

The activated carbon which has been produced from the specified woods ranges between about 17% and about 26% of the weight of dry wood treated. The MBT value of such activated carbon has ranged between about 8 and about 15 while the BET value has ranged between about 665 and about 1085 m.²/g.

It will be understood that when sugars are the product principally desired, the method may be interrupted as soon as the sugar condensate has been recovered, that is, the residue of the cellulosic material would be discarded without being transported to the carbonizing tower. Similarly, if activated carbon is not to be produced, the foregoing method may be interrupted with the collection of gases from the carbonizing tower, that is, without transferring the carbonized material to the activating tower. Also, it is to be understood that the carbonizing step may be combined with the activating step, that is, the cellulosic material from the extraction tower may be rapidly heated to within the activating range of between 500° C. and 1000° C. without removal of acids or tars, and the heating time may range from about 30 minutes and about 5 hours.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

1. The method of treating cellulosic material including hemicellulose and lignin which comprises the steps of charging such material into a closed chamber, treatiing said material with a mixture of the vapors of a dilute acid solution and steam in the upper part of said chamber, heating the upper part of the chamber and its contents with steam in a steam jacket at a temperature of between about 100° C. and about 150° C. for between about 30 minutes and about 5 hours, thereby causing said vapors to enter interstices of the said material and to decompose the hemicellulose, condensing the resulting vapors in a lower part of said chamber, and withdrawing the sugar containing condensate from the lower portion of said chamber.

2. The method set forth in claim 1 in which the said acid solution contains between about 0.5% and about 6% of acid.

3. The method set forth in claim 1 in which the said acid solution contains between about 0.5% and about 6% of a mixture of an inorganic acid selected from the group of acids consisting of hydrochloric, sulphuric, nitric, hydrofluoric and boric acid and an organic acid selected from the group consisting of formic, acetic and pyroligneous acids.

4. The method set forth in claim 1 in which, after removal of the sugar containing condensate, moisture is removed therefrom.

5. The method set forth in claim 4 in which the residue of said material is discharged into a second closed chamber and heated at a temperature of between about 280° C. and about 500° C. for between about 1 hour and about 10 hours, thereby driving off vapors of acids and tars from, and carbonizing, said residue material, condensing the resulting vapors and withdrawing the condensate.

6. The method set forth in claim 1 in which the residue of said material is discharged into a second closed chamber and is heated at a temperature of between about 280° C. and about 500° C. for between about 1 hour and about 10 hours, thereby driving off vapors of acids and tars from, and carbonizing, the said residue of the material, condensing the resulting vapors and withdrawing the condensate.

7. The method set forth in claim 6 in which the carbonized material is discharged into a third closed chamber and is heated therein in the presence of an inert gas and steam at a temperature of between about 500° C. and 1000° C. for between about 30 minutes and about 5 hours, thereby activating the carbonized material, withdrawing and condensing tar containing gases, and cooling the resulting activated carbon.

8. The continuous method of treating cellulosic material including hemicellulose and lignin which comprises the steps of
   (a) treating the material in finely divided form with a dilute mixture of organic and inorganic acids in the upper part of a first closed chamber and heating the material and acids with steam to a temperature of between about 100° C. and about 150° C. for between about 30 minutes and about 5 hours while condensing the resulting vapors in a lower part of said chamber and withdrawing the sugar and acid containing condensate from said chamber,
   (b) discharging the residue material from the first chamber into a second closed chamber and heating and carbonizing such material by a heated inert gas and steam at a temperature between about 280° C. and about 500° C. for between about 2 hours and about 12 hours,
   (c) condensing the resulting vapors and withdrawing the tar containing condensate from said chamber,
   (d) passing the carbonized material from the second chamber into a third closed member, and
   (e) heating the carbonized material in the presence of an inert gas and steam at a temperature between about 500° C. and about 1000° C. for between about 30 minutes and about 5 hours, and cooling and withdrawing the resultant activated carbon.

9. The method set forth in claim 8 in which uncondensed gases are separated from the condensates from the said three chambers, and is compressed, heated, freed of liquid and recycled to the said second and third chambers.

10. The method of treating cellulosic material including hemicellulose and lignin which comprises successively carrying out the steps of
    (a) charging such material into a closed chamber,
    (b) treating said material with a mixture of the vapors of a dilute acid solution and steam in the upper part of said chamber,
    (c) heating the upper part of the chamber and the contents therewithin with steam in a jacket at a temperature of between about 100° C. and 150° C. for between about 30 minutes and about 5 hours, thereby causing the vapors to enter the interstices of the said material and decompose the hemicellulose,
    (d) condensing the resulting vapors in a lower part of said chamber,
    (e) withdrawing the resulting condensate containing sugars and acids from a lower portion of said chamber,
    (f) discharging the residue material from said first chamber into a second closed chamber, heating said material at a temperature of between about 280° C. and about 500° C. for between about 1 hour and about 10 hours, thereby driving off inert gases and vapors of acids and tars from, and carbonizing, the said residue material,
    (g) condensing said vapors and withdrawing the resulting condensate,
    (h) discharging said carbonized material from the second chamber into a third closed chamber and heating it therein in the presence of an inert gas and steam at a temperature of about 500° C. and about 1000° C. for between about 30 minutes and about 5 hours, thereby activating said carbonized material,
    (i) withdrawing and condensing the tar containing gases liberated during such heating, and
    (j) cooling the activated carbon.

11. The continuous method of treating cellulosic material including hemicellulose and lignin which comprises the steps of
    (a) successively charging such material into a closed chamber,
    (b) continuously treating said material with a mixture of steam and the vapors of a dilute acid solution containing at least one inorganic acid selected from the group consisting of hydrochloric, sulphuric, nitric, hydrofluoric and hydrobromic acids and at least one organic acid selected from the group consisting of formic, acetic and pyroligneous acids,
    (c) heating the upper part of the chamber and the contents therewithin with steam in a jacket at a temperature of between about 100° C. and 150° C. for between about 30 minutes and about 5 hours, thereby causing the vapors to enter the interstices of the said material and decompose the hemicellulose,
    (d) condensing the resulting vapors in a lower part of said chamber,
    (e) withdrawing the condensate containing sugars and acids from a lower portion of said chamber,
    (f) discharging the residue material from said first chamber into a second closed chamber, heating said material therein at a temperature of between about 280° C. and about 500° C. for between about 1 hour and about 10 hours, thereby driving off inert gases and vapors of acids and tars from, and carbonizing, the said residue material,
    (g) condensing said vapors and withdrawing the resulting condensate,
    (h) recycling the inert gases to the second heating chamber;
    (i) discharging said carbonized material from the second chamber into a third closed chamber and heating it therein in the presence of an inert gas and steam at a temperature of about 500° C. and about 1000° C. for between about 30 minutes and about 5 hours, thereby activating said carbonized material,
    (j) withdrawing and condensing the tar containing gases liberated during such heating, and
    (k) cooling the activated carbon.

References Cited
UNITED STATES PATENTS

| | | | |
|---|---|---|---|
| 1,249,041 | 12/1917 | Demme | 252—421 |
| 1,563,295 | 2/1920 | Sauer | 252—421 |
| 2,289,917 | 7/1942 | Lambiotte | 201—34 |
| 2,681,871 | 6/1954 | Wallace | 127—37 X |
| 2,734,836 | 2/1956 | Elian | 127—37 |
| 3,184,397 | 5/1960 | Work | 252—445 |
| 3,251,716 | 5/1966 | Porter | 127—37 |
| 3,379,622 | 4/1968 | Dreusche | 201—34 X |

MORRIS O. WOLK, Primary Examiner

S. MARANTZ, Assistant Examiner

U.S. Cl. X.R.

23—209.1; 127—1, 37; 201—28, 34; 252—445